(12) United States Patent
Tsai (10) Patent No.: US 9,400,415 B2
(45) Date of Patent: Jul. 26, 2016

(54) IMAGE DISPLAYING DEVICE AND METHOD

(71) Applicant: Young Optics Inc., Hsinchu (TW)

(72) Inventor: Chih-Hsien Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 261 days.

(21) Appl. No.: 14/051,135

(22) Filed: Oct. 10, 2013

(65) Prior Publication Data

US 2014/0104317 A1    Apr. 17, 2014

(30) Foreign Application Priority Data

Oct. 11, 2012    (CN) .......................... 2012 1 0383521

(51) Int. Cl.
| | |
|---|---|
| *G03B 21/14* | (2006.01) |
| *G09G 5/377* | (2006.01) |
| *G02B 27/10* | (2006.01) |
| *G02B 27/22* | (2006.01) |
| *G02B 27/18* | (2006.01) |
| *G03B 21/20* | (2006.01) |

(52) U.S. Cl.
CPC ................ *G03B 21/14* (2013.01); *G02B 27/10* (2013.01); *G02B 27/18* (2013.01); *G02B 27/22* (2013.01); *G02B 27/2214* (2013.01); *G03B 21/208* (2013.01); *G09G 5/377* (2013.01)

(58) Field of Classification Search
CPC ........ G02B 27/10; G02B 27/12; G02B 27/18; G02B 27/123; G02B 27/126; G02B 27/22; G02B 27/2214; G09G 5/377; G03B 21/14; G03B 21/208

USPC .......................... 359/463, 462, 630, 618, 619
See application file for complete search history.

(56) References Cited

U.S. PATENT DOCUMENTS

| | | | | |
|---|---|---|---|---|
| 5,712,732 | A * | 1/1998 | Street ................. | G02B 27/0093 348/E13.004 |
| 7,400,447 | B2 * | 7/2008 | Sudo .................. | H04N 13/0409 348/E13.029 |
| 2005/0174775 | A1 * | 8/2005 | Conner .............. | G02B 27/0994 362/268 |
| 2012/0127570 | A1 * | 5/2012 | Sakai ................. | G02B 27/2214 359/463 |

FOREIGN PATENT DOCUMENTS

| | | |
|---|---|---|
| CN | 2519923 Y | 11/2002 |
| CN | 101919258 A | 12/2010 |
| CN | 102132193 A | 7/2011 |

OTHER PUBLICATIONS

The Office Action for the CN 20121083521.0 Application.

* cited by examiner

*Primary Examiner* — Bumsuk Won
*Assistant Examiner* — William R Alexander
(74) *Attorney, Agent, or Firm* — Haverstock & Owens LLP (57) ABSTRACT

An image displaying device includes a light diffuser and an image superposing unit. The light diffuser includes an incident side and an emergent side. The image superposing unit emerges therefrom a plurality of image lights, and superposes the plurality of image lights onto the incident side, wherein the plurality of superposed image lights pass through the light diffuser, and the light diffuser only displays an image corresponding to one of the plurality of image lights in an observation direction on the emergent side.

14 Claims, 7 Drawing Sheets

IMAGE DISPLAYING DEVICE AND METHOD

CROSS-REFERENCE TO RELATED APPLICATION AND CLAIM OF PRIORITY

The application claims the benefit of China Patent Application No. 201210383521.0, filed on Oct. 11, 2012, at the State Intellectual Property Office of China, the disclosures of which are incorporated herein in their entirety by reference.

TECHNICAL FIELD

The present disclosure relates to an optical device and, more particularly, relates to an image displaying device and method.

BACKGROUND

An image projection system such as a projection television or a video projector generates an image by using a specially manufactured image display medium such as a small cathode-ray tube (CRT) or a liquid crystal display, magnifies the image by using a projection lens, and projects the magnified image on a large screen.

An image projection system includes a red monochrome CRT, a green monochrome CRT, a blue monochrome CRT, a first projection lens, a second projection lens, a third projection lens and a screen. The red, the green and the blue monochrome CRTs respectively serve as image sources, respectively correspond to the first, the second and the third projection lenses, and respectively generate a red image, a green image and a blue image. The first projection lens enlarges and projects the red image; the second projection lens enlarges and projects the green image; and the third projection lens enlarges and projects the blue image. The first, the second and the third projection lenses superpose the red, the green and the blue images onto the screen to cause the screen to receive a projected light.

The screen distributes the projected light properly so that the distribution of the projected light can be perceived as an image from various angles. The screen generally includes a Fresnel lens sheet and a lenticular lens array sheet. The Fresnel lens sheet causes the projected light to converge and converts the projected light into a substantially parallel light, wherein the projected light enters the screen divergently from the center to the periphery of the screen. The lenticular lens array sheet diffuses the projected light converted into the substantially parallel light so that the projected light can be perceived as an image from various angles.

The lenticular lens array sheet for diffusing the projected light instead of a simple diffusion sheet can implement an anisotropic diffusion function and a color-shift correction function.

The anisotropic diffusion function can effectively distribute a limited light and increase the luminance in the effective observation region. The anisotropic diffusion function is generally provided by adding a diffusion material inside the lenticular lens array sheet so as to provide a relatively wide angle of view in the horizontal direction and provide a relatively narrow angle of view in the vertical direction. The lenticular lens array sheet includes an incident side and an emergent side. For the color shift correction function, two lenticular lens arrays are respectively provided on the incident side and the emergent side.

The image projection system can have a further application and variation.

SUMMARY OF EXEMPLARY EMBODIMENTS

It is an aspect of the present disclosure to provide an image displaying device and method.

It is therefore an embodiment of the present disclosure to provide an image displaying device. The image displaying device includes an optical axis and a lens device. The optical axis has an optical axis direction. The lens device includes an incident side and an emergent side. The incident side receives a first image light incident in a principal incident direction. The emergent side emerges therefrom a second image light associated with the first image light in a principal emergent direction to form an image, such that when the principal incident direction deviates from the optical axis direction, the principal emergent direction further deviates from the optical axis direction.

It is therefore another embodiment of the present disclosure to provide an image displaying device. The image displaying device includes a light diffuser and an image superposing unit. The light diffuser includes an incident side and an emergent side. The image superposing unit emerges therefrom a plurality of image lights, and superposes the plurality of image lights onto the incident side, wherein the plurality of superposed image lights pass through the light diffuser, and the light diffuser only displays an image corresponding to one of the plurality of image lights in an observation direction on the emergent side.

It is therefore still another embodiment of the present disclosure to provide an image displaying method. The image displaying method includes the following steps. A plurality of image lights is provided. The plurality of image lights are superposed. An image is displayed from only one of the plurality of superposed image lights.

BRIEF DESCRIPTION OF THE DRAWINGS

The foregoing and other features and advantages of the present disclosure will be more clearly understood through the following descriptions with reference to the drawings, wherein.

DETAIL DESCRIPTION OF THE PREFERRED EMBODIMENTS

The present disclosure will now be described more specifically with reference to the following embodiments. It is to be noted that the following descriptions of preferred embodiments of this disclosure are presented herein for the purposes of illustration and description only; it is not intended to be exhaustive or to be limited to the precise form disclosed.

Embodiments of the present disclosure will now be described with reference to the drawings. In each of the following embodiments, unless stated otherwise, the direction of light propagation is set along z axis (the direction parallel to the optical axis), and when an observer is facing the direction of light propagation, his twelve o'clock direction is taken as y axis (the vertical direction) and his three o'clock direction as x axis (horizontal direction).

Figure 1:
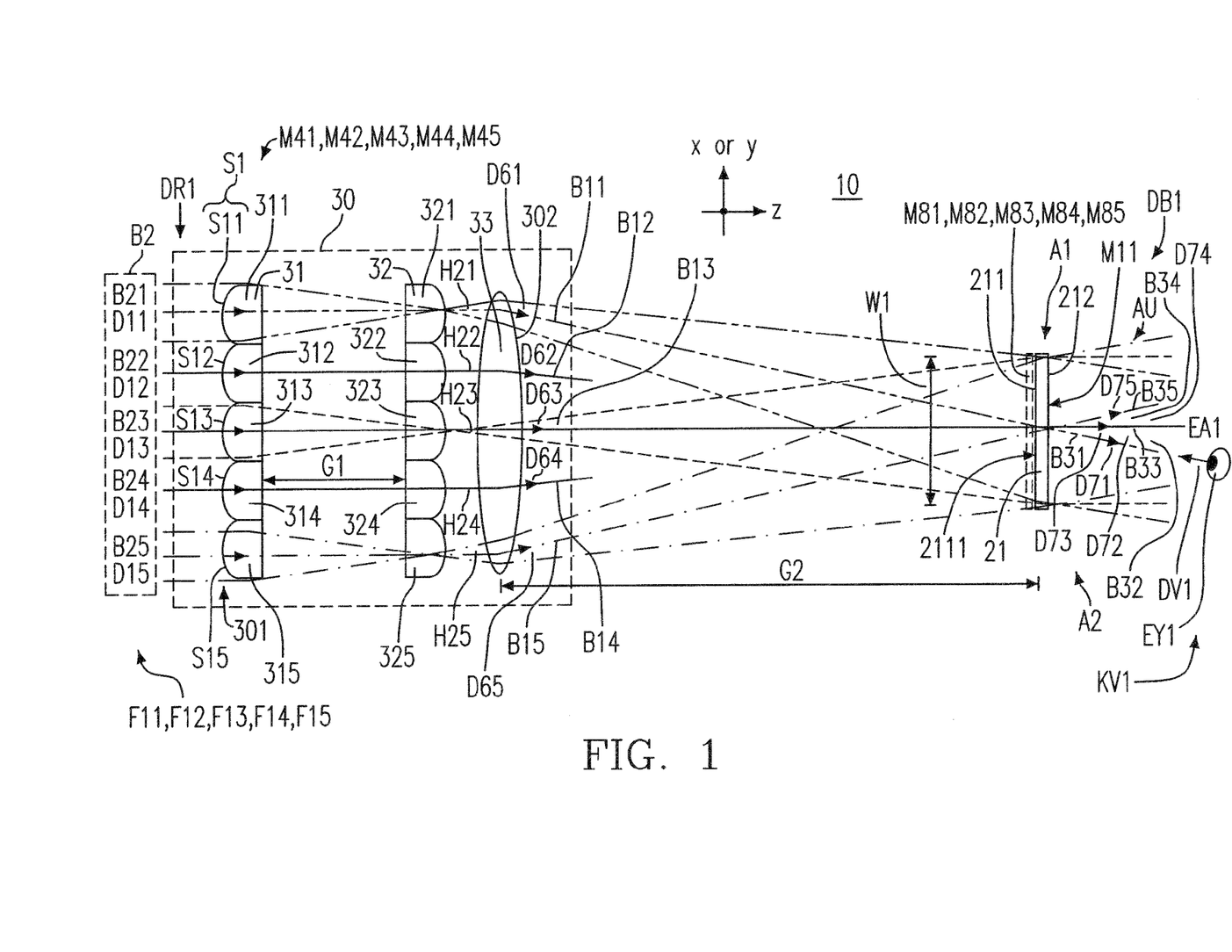
FIG. 1 is a schematic diagram showing an image displaying device according to some embodiments of the present disclosure.

Please refer to FIG. 1, which is a schematic diagram showing an image displaying device 10 according to some embodiments of the present disclosure. The image displaying device 10 includes a light diffuser 21 and an image superposing unit 30 coupled to the light diffuser 21. The light diffuser 21 includes an incident side 211 and an emergent side 212. The image superposing unit 30 emerges therefrom (or emits) a plurality of image lights B11, B12, B13, B14 and B15, and superposes the plurality of image lights B11, B12, B13, B14 and B15 onto the incident side 211, wherein the plurality of superposed image lights pass through the light diffuser 21, and the light diffuser 21 only displays an image M11 corresponding to one (such as the image light B11) of the plurality of image lights B11, B12, B13, B14 and B15 in an observation direction DV1 on the emergent side 212.

In one embodiment, the image displaying device 10 includes an optical axis EA1; and the image superposing unit 30 includes an incident side 301 and an emergent side 302 opposite to the incident side 301. The incident side 301 includes an incident surface array S1, which includes a plurality of incident surfaces S11, S12, S13, S14 and S15. The plurality of incident surfaces S11, S12, S13, S14 and S15 are linearly arranged in a reference direction DR1, and respectively receive a plurality of image lights B21, B22, B23, B24 and B25. For instance, the optical axis EA1 is a system optical axis; and the reference direction DR1 is perpendicular to the optical axis EA1, and is one selected from a group consisting of a horizontal direction, a vertical direction and an oblique direction. The plurality of image lights B21, B22, B23, B24 and B25 impinge in a plurality of respective principal incident directions D11, D12, D13, D14 and D15 on the plurality of respective incident surfaces S11, S12, S13, S14 and S15 to enter the image superposing unit 30, and are respectively derived from a plurality of viewing fields F11, F12, F13, F14 and F15. For instance, the plurality of principal incident directions D11, D12, D13, D14 and D15 are a plurality of center-light incident directions respectively; and the plurality of viewing fields F11, F12, F13, F14 and F15 are the same or different.

In one embodiment, the image superposing unit 30 projects or superposes the plurality of image lights B21, B22, B23, B24 and B25 onto the incident side 211 by respectively converting the plurality of image lights B21, B22, B23, B24 and B25 into the plurality of image lights B11, B12, B13, B14 and B15. For instance, the plurality of image lights B11, B12, B13, B14 and B15 respectively emerge in a plurality of principal emergent directions D61, D62, D63, D64 and D65 from the emergent side 302. For instance, the plurality of principal emergent directions D61, D62, D63, D64 and D65 are a plurality of center-light incident directions respectively, and are different.

In one embodiment, the light diffuser 21 has a light diffusion angle A1, and is only observed in an observation direction DV1. For instance, the emergent side 212 of the light diffuser 21 is opposite to the incident side 211 of the light diffuser 21; the eye EY1 of an observer KV1 aims to the emergent side 212 of the light diffuser 21; the observer KV1 only observes the light diffuser 21 in the observation direction DV1; and the observation direction DV 1 is variable. The plurality of image lights B11, B12, B13, B14 and B15 are superposed onto the incident side 211 to cause the emergent side 212 of the light diffuser 21 to emerge therefrom (or emit) a plurality of image lights B31, B32, B33, B34 and B35 respectively corresponding to the plurality of image lights B11, B12, B13, B14 and B15, wherein the plurality of image lights B31, B32, B33, B34 and B35 respectively emerge in a plurality of principal emergent directions D71, D72, D73, D74 and D75 from the emergent side 212. For instance, the plurality of principal emergent directions D71, D72, D73, D74 and D75 are a plurality of principal-intensity light emergent directions.

In one embodiment, the image M11 presents in a principal emergent direction DB1 being one (such as the principal emergent direction D71) of the plurality of principal emergent directions D71, D72, D73, D74 and D75. For instance, when the image M11 presents in the principal emergent direction D71 (i.e., the principal emergent direction DB1 represents the principal emergent direction D71), the image light B31 forms the image M11; and when the image M11 presents in the principal emergent direction D73 (i.e., the principal emergent direction DB1 represents the principal emergent direction D73), the image light B33 forms the image M11. When the observation direction DV1 is opposite to or faces the principal emergent direction DB1, the emergent side 212 of the light diffuser 21 only displays the image M11. For instance, when the observer KV1 faces the emergent side 212 and the observation direction DV1 is opposite to or faces the principal emergent direction D71, the emergent side 212 of the light diffuser 21 only displays the image M11 formed by the image light B31; and when the observer KV1 faces the emergent side 212 and the observation direction DV1 is opposite to or faces the principal emergent direction D73, the emergent side 212 of the light diffuser 21 only displays the image M11 formed by the image light B33.

In one embodiment, any two of the plurality of principal emergent directions D71, D72, D73, D74 and D75 have an angle AU therebetween, wherein the angle AU is greater than a specific angle A2 associated with the light diffusion angle A1. For instance, the angle AU is greater than the light diffusion angle A1. For instance, the light diffusion angle A1 and the specific angle A2 have a proportional relationship therebetween; and the any two principal emergent directions are any two neighboring principal emergent directions.

In one embodiment, the image superposing unit 30 includes a lens array 31, a lens array 32 and a light superposing unit 33, wherein the lens array 32 is coupled to the lens array 31, and the light superposing unit 33 is coupled to the lens array 32. For instance, the lens array 32 is disposed between the lens array 31 and the light superposing unit 33. The lens array 31 includes the incident surface array S1 and a plurality of lenses 311, 312, 313, 314 and 315, wherein the plurality of lenses 311, 312, 313, 314 and 315 include the plurality of incident surfaces S11, S12, S13, S14 and S15, respectively. The plurality of image lights B21, B22, B23, B24 and B25 respectively impinge on the plurality of incident surfaces S11, S12, S13, S14 and S15 to enter the image superposing unit 30, and forms a plurality of respective aerial images M41, M42, M43, M44 and M45 on the plurality of respective incident surfaces S11, S12, S13, S14 and S15. For instance, the plurality of aerial images M41, M42, M43, M44 and M45 are respectively derived from the plurality of different viewing fields F11, F12, F13, F14 and F15.

In one embodiment, the lens array 32 includes a plurality of lenses 321, 322, 323, 324 and 325, which respectively correspond to the plurality of lenses 311, 312, 313, 314 and 315. The light superposing unit 33 includes the emergent side 302, and emerges therefrom (or emits) the plurality of image lights B11, B12, B13, B14 and B15. The plurality of image lights B21, B22, B23, B24 and B25 are respectively converted into the plurality of image lights B11, B12, B13, B14 and B15 through the lens array 31, the lens array 32 and the light superposing unit 33.

In one embodiment, the incident side 211 of the light diffuser 21 includes a specific area 2111 on the incident side 211. The plurality of aerial images M41, M42, M43, M44 and M45 are respectively derived from a plurality of sub-pictures of a picture. The image superposing unit 30 uses the lens arrays 31 and 32 and the light superposing unit 33 to superpose the plurality of aerial images M41, M42, M43, M44 and M45 onto the same specific area 2111 so as to split the picture and form a plurality of aerial images M81, M82, M83, M84 and M85 superposed on the specific area 2111. For instance, the light diffusion angle A1 of the light diffuser 21 causes the light diffuser 21 to have a property of a viewing-angle limitation. The light diffuser 21 gives according to the light diffusion angle A1 a limitation that an observer under a specific sight line can only watch an image corresponding to a specific sub-picture, wherein the specific sub-picture is one selected from the plurality of sub-pictures.

In one embodiment, the image superposing unit 30 receives an image light B2, splits the image light B2 into a plurality of partial lights H21, H22, H23, H24 and H25, and superposes the plurality of partial lights H21, H22, H23, H24 and H25 onto the incident side 211 to form the plurality of aerial images M81, M82, M83, M84 and M85 superposed on the incident side 211, wherein the plurality of aerial images M81, M82, M83, M84 and M85 respectively correspond to the plurality of partial lights H21, H22, H23, H24 and H25. For instance, the image superposing unit 30 splits the image light B2 into the plurality of partial lights H21, H22, H23, H24 and H25 by using the lens arrays 31 and 32, converts the plurality of partial lights H21, H22, H23, H24 and H25 respectively into the plurality of image lights B11, B12, B13, B14 and B15 by using the light superposing unit 33, thereby forming the plurality of image lights B31, B32, B33, B34 and B35 respectively.

In one embodiment, the image light B2 includes the plurality of image lights B21, B22, B23, B24 and B25, which respectively enter the plurality of incident surfaces S11, S12, S13, S14 and S15 to respectively form the plurality of partial lights H21, H22, H23, H24 and H25. The plurality of lenses 311, 312, 313, 314 and 315 respectively transmit the plurality of image lights B21, B22, B23, B24 and B25; and the light superposing unit 33 refracts the plurality of partial lights H21, H22, H23, H24 and H25 to superpose the plurality of partial lights H21, H22, H23, H24 and H25 onto the incident side 211.

In one embodiment, the lens array 31 is formed to be a matrix of M rows and N columns of lenses. For instance, M=3, and N=1. For instance, M=1, and N=3. For instance, M=2, and N=5. For instance, each of the plurality of lenses 311, 312, 313, 314 and 315 is a plano-convex lens, and has the contour of a substantially rectangular shape in order to have a compact configuration among the plurality of lenses 311, 312, 313, 314 and 315. In one embodiment as shown in FIG. 1, M=1, and N=3. Viewed from the z direction, the shape of each of the plurality of lenses 311, 312, 313, 314 and 315 is not limited to the rectangular shape. Each of the plurality of lenses 311, 312, 313, 314 and 315 may be given an external shape, which corresponds to the shape of the light diffuser 21.

For instance, when the aspect ratio of the light diffuser 21 is at 4:3, the aspect ratio of the lens 311 is also set to be at 4:3.

In one embodiment, the plurality of lenses 311, 312, 313, 314 and 315 have flat-plate portions (not shown) thereamong, and are linked by the flat-plate portions, so that the plurality of lenses 311, 312, 313, 314 and 315 are spaced apart from each other. In one embodiment, the lens array 32 is also formed to be a matrix of M rows and N columns of lenses. For instance, the lens array 32 has a configuration substantially the same as that of the lens array 31; and each of the plurality of lenses 321, 322, 323, 324 and 325 is a plano-convex lens, and has a shape the same as that of the lens 311.

In one embodiment, the lens arrays 31 and 32 have a distance G1 therebetween; and the plurality of lenses 311, 312, 313, 314 and 315 cause the plurality of image lights B21, B22, B23, B24 and B25 to respectively converge in the respective vicinities of the plurality of lenses 321, 322, 323, 324 and 325. For instance, through the respective converge actions of the plurality of image lights B21, B22, B23, B24 and B25, the plurality of partial lights H21, H22, H23, H24 and H25 respectively emerging from the plurality of lenses 321, 322, 323, 324 and 325 fall to be incident on the light superposing unit 33. The light superposing unit 33 and the light diffuser 21 have a distance G2 therebetween; and the light diffuser 21 has a width W 1. The light superposing unit 33 superposes the plurality of image lights B11, B12, B13, B14 and B15 onto more or less the same position on the light diffuser 21. Therefore, the light diffuser 21 is substantially illuminated by the plurality of image lights B11, B12, B13, B14 and B15.

In one embodiment, each of the lens arrays 31 and 32 is a plano-convex lens array, and the lens arrays 31 and 32 respectively include a first convex side and a second convex side; the reverse side of the first convex side faces an image source of the plurality of image lights B21, B22, B23, B24 and B25, and the second convex side faces the image source; and the light superposing unit 33 is a biconvex lens. However, other lenses such as plano-convex lenses or biconvex lenses may be used. Moreover, under the condition that the plano-convex lenses are used, there is no restriction on which is the convex side. However, taking into consideration of the optical characteristics of the lenses, it is preferable that the first and the second convex sides face each other or are back to back with each other.

In one embodiment, the lens array 32 and the light superposing unit 33 have a space therebetween. However, the lens array 32 and the light superposing unit 33 may be optically integrated in order to reduce the interface light loss between the elements, thereby improving the light utilization efficiency. In one embodiment, the lens arrays 31 and 32 may be integrated to form an integrated lens array so as to set the distance G1 to be zero. In one embodiment, the light superposing unit 33 and the lens arrays 31 and 32 may be integrated to form an optical element. In one embodiment, the plurality of image lights B21, B22, B23, B24 and B25 respectively emerge from a plurality of areas on the same panel (not shown), wherein the plurality of areas are separate or split. In one embodiment, the image light B2 emerges from an imaging area on the panel, wherein the imaging area may include the plurality of areas. The image superposing unit 30 splits the image light B2 into the plurality of partial lights H21, H22, H23, H24 and H25, and refracts the plurality of partial lights H21, H22, H23, H24 and H25 to superpose the plurality of image lights B11, B12, B13, B14 and B15 onto the incident side 211 of the light diffuser 21.

In one embodiment, a projection system includes a panel, which is split to provide more than two pictures and make a superposition to the more than two pictures. Under this condition, the pictures of the two sides (deviated from the optical axis center) of the panel can form distortion when the pictures are superposed. Although the distortion may be adjusted and compensated by using a non-spherical mirror, it is possible to result in the following effects: the cost is too high; the allowable tolerance zone of the non-spherical mirror is very small, so that the yield is low in the mass production; and the volume of the device having the reflection-mode architecture is too large, so that the reliability thereof may be low.

Figure 2:
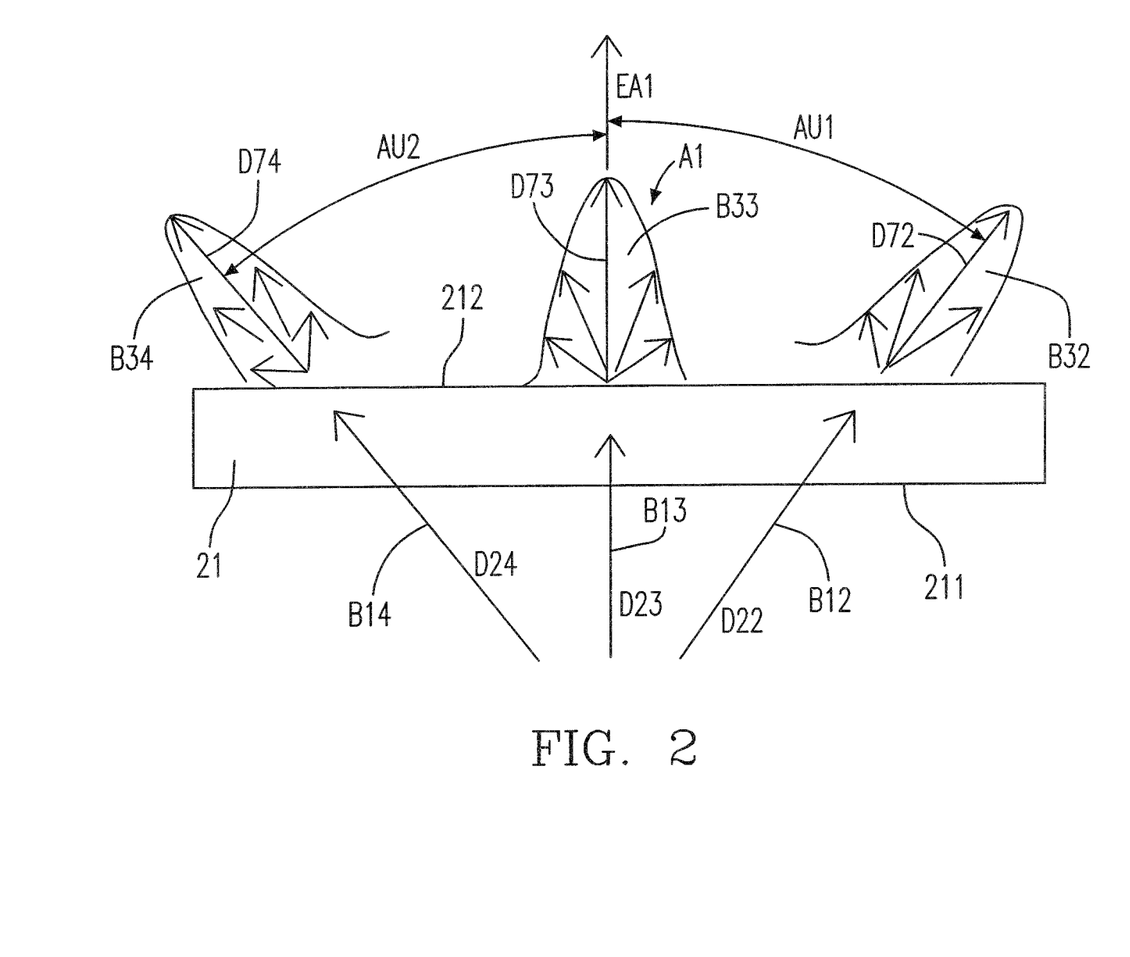
FIG. 2 is a schematic diagram showing an operation of a light diffuser in FIG. 1.

Please refer to FIG. 2, which is a schematic diagram showing an operation of the light diffuser 21 in FIG. 1. FIG. 2 shows the light diffuser 21, the image lights B12, B13 and B14, and the image lights B32, B33 and B34. The image lights B12, B13 and B14 respectively impinge in the principal incident directions D22, D23 and D24 on the incident side 211 to enter the light diffuser 21. For instance, the principal incident directions D22, D23 and D24 are center-light incident directions, respectively. The image lights B32, B33 and B34 respectively emerge in the principal emergent directions D72, D73 and D74 from the emergent side 212. For instance, when each of the image lights B12, B13 and B14 has a uniform light-intensity distribution, the image lights B32, B33 and B34 have maximum light intensities respectively in specific emergent directions, wherein the principal emergent directions D72, D73 and D74 are the specific emergent directions, respectively. For instance, the image lights B12, B13 and B14 pass through the light diffuser 21 to respectively form the image lights B32, B33 and B34.

In one embodiment, the light diffuser 21 has a light diffusion angle A1; the neighboring principal emergent directions D72 and D73 have an angle AU1 therebetween; and the neighboring principal emergent directions D73 and D74 have an angle AU2 therebetween. For instance, each of the angles AU1 and AU2 is greater than the light diffusion angle A1 in order that the light diffuser 21 only displays an image M11 corresponding to one (such as the image light B12) of the image lights B12, B13 and B14 on the emergent side 212.

Figure 3:
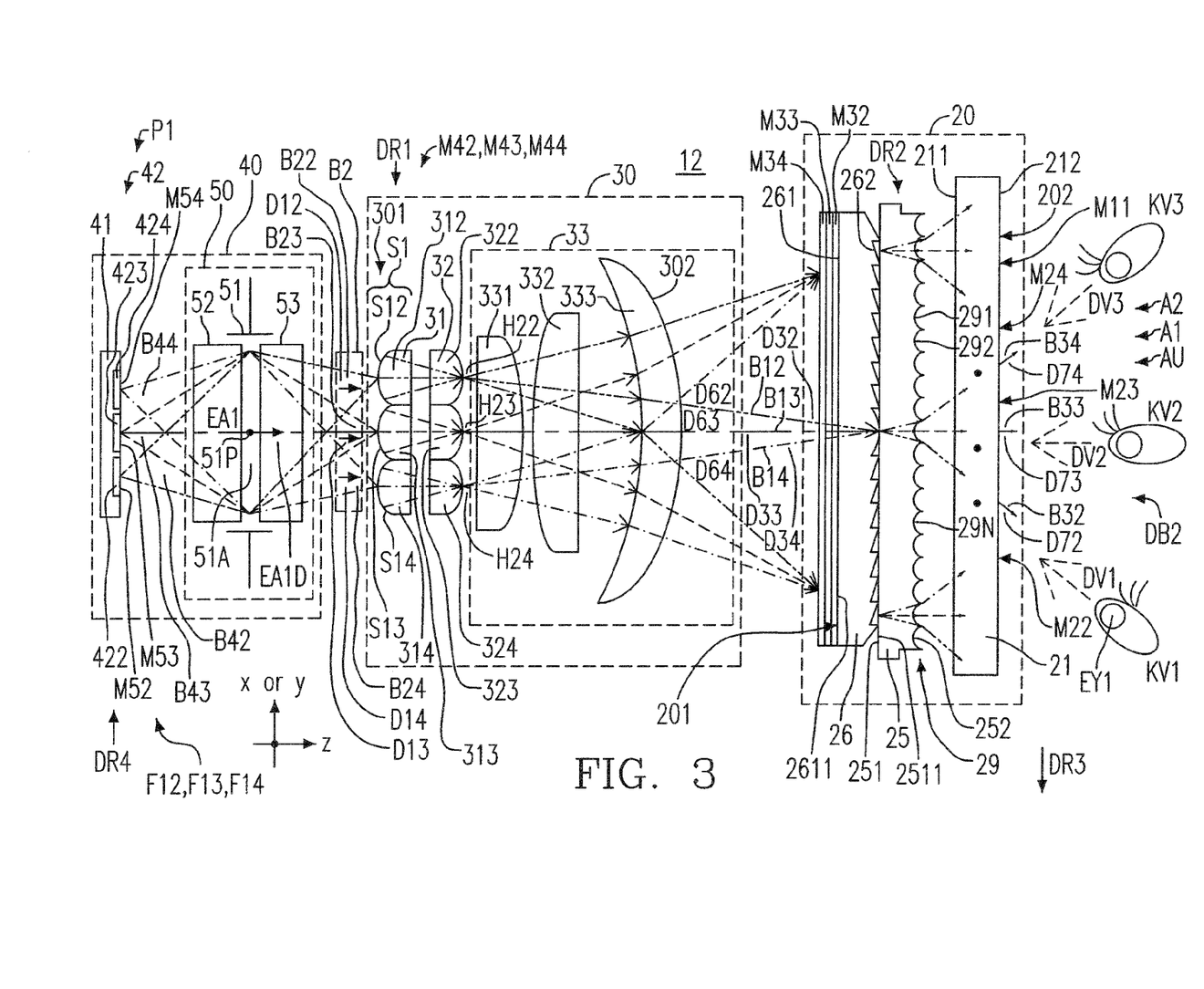
FIG. 3 is a schematic diagram showing an image displaying device according to some embodiments of the present disclosure.

Please refer to FIG. 3, which is a schematic diagram showing an image displaying device 12 according to some embodiments of the present disclosure. The image displaying device 12 includes a display module 20, an image superposing unit 30 coupled to the display module 20, and a pre-imaging unit 40 coupled to the image superposing unit 30. The display module 20 includes an incident surface 201 and an emergent surface 202 opposite to the incident surface 201. The image superposing unit 30 emerges therefrom (or emits) a plurality of image lights B12, B13 and B14, and superposes the plurality of image lights B12, B13 and B14 onto the incident surface 201. The display module 20 only displays an image M11 corresponding to one (such as the image light B12) of the plurality of image lights B12, B13 and B14 in an observation direction (such as the observation direction DV1) on the emergent surface 202.

In one embodiment, the image displaying device 12 further includes an optical axis EA1, which has an optical axis direction EA1D; and the display module 20 includes a light diffuser 21, a linear concave lens 25 coupled to the light diffuser 21, and a Fresnel lens 26 coupled to the linear concave lens 25. The light diffuser 21 includes an incident side 211 and an emergent side 212 opposite to the incident side 211, wherein the emergent side 212 includes the emergent surface 202. The image superposing unit 30 superposes the plurality of image lights B12, B13 and B14 onto the incident side 211 through the Fresnel lens 26 and the linear concave lens 25 to cause the emergent side 212 to emerge therefrom (or emit) a plurality of image lights B32, B33 and B34 respectively corresponding to the plurality of image lights B12, B13 and B14, wherein the plurality of image lights B32, B33 and B34 respectively emerge in a plurality of principal emergent directions D72, D73 and D74 from the emergent side 212. For instance, the image superposing unit 30 is coupled to the display module 20 through the plurality of image lights B12, B13 and B14. For instance, the display module 20 serves as a rear projection screen.

In one embodiment, the light diffuser 21 has a light diffusion angle A1, and is only observed in an observation direction DV1. For instance, the eye EY1 of an observer KV1 aims to the emergent side 212 of the light diffuser 21; the observer KV1 only observes the light diffuser 21 in the observation direction DV1. The image M11 presents in a principal emergent direction DB1 being one (such as the principal emergent direction D72 corresponding to the image light B32) of the plurality of principal emergent directions D72, D73 and D74. When the observation direction DV1 is opposite to the principal emergent direction DB1, the emergent side 212 of the light diffuser 21 only displays the image M11 (such as an image formed by the image light B32). When the observation direction DV1 is opposite to another principal emergent direction (such as the principal emergent direction D73), the emergent side 212 of the light diffuser 21 only displays another image (such as an image formed by the image light B33). In one embodiment, any two of the plurality of principal emergent directions D72, D73 and D74 have an angle AU therebetween, wherein the angle AU is greater than a specific angle A2 associated with the light diffusion angle A1. For instance, the angle AU is greater than the light diffusion angle A1. For instance, the light diffusion angle A1 and the specific angle A2 have a proportional relationship therebetween; and the any two principal emergent directions are any two neighboring principal emergent directions.

In one embodiment, a plurality of observers KV1, KV2 and KV3 only respectively observe the light diffuser 21 in a plurality of observation directions DV1, DV2 and DV3, wherein each of the plurality of observation directions DV1, DV2 and DV3 is variable. When the plurality of observation directions DV1, DV2 and DV3 are opposite to the plurality of principal emergent directions D72, D73 and D74 respectively, the plurality of image lights B32, B33 and B34 only respectively form a plurality of images M22, M23 and M24 on the emergent side 212 to cause the emergent side 212 of the light diffuser 21 to only display the plurality of images M22, M23 and M24. That is to say, the plurality of observers KV1, KV2 and KV3 only respectively perceive the plurality of images M22, M23 and M24, when the plurality of observation directions DV1, DV2 and DV3 are opposite to the plurality of principal emergent directions D72, D73 and D74, respectively. For instance, the image M11 is one selected from the plurality of images M22, M23 and M24.

In one embodiment, the linear concave lens 25 includes an incident side 251 and an emergent side 252 opposite to the incident side 251. The incident side 251 includes a flat surface 2511; and the emergent side 252 is coupled to the incident side 211 of the light diffuser 21, and includes a concave cylindrical lens array 29. For instance, the linear concave lens 25 further includes a longitudinal direction DR2 (being a direction perpendicular to the sheet) perpendicular to the optical axis EA1. The concave cylindrical lens array 29 includes a plurality of concave cylindrical lenses 291, 292 . . . 29N, which are linearly arranged in a reference direction DR3, wherein the reference direction DR3 is perpendicular to the optical axis EA1 and the longitudinal direction DR2. For instance, the concave cylindrical lens array 29 or each of the plurality of concave cylindrical lenses 291, 292 ... 29N has a direction parallel to the longitudinal direction DR2. In one embodiment, the flat surface 2511 and the concave cylindrical lens array 29 may be mirrored in relation to a reference plane between the flat surface 2511 and the concave cylindrical lens array 29; and under this condition, the flat surface 2511 is replaced with a concave cylindrical lens array opposite to the concave cylindrical lens array 29, and the concave cylindrical lens array 29 is replaced with a flat surface opposite to the flat surface 2511.

In one embodiment, the Fresnel lens 26 includes an incident side 261 and an emergent side 262 opposite to the incident side 261, wherein the emergent side 262 is coupled to the incident side 251 of the linear concave lens 25, and the incident side 261 includes the incident surface 201. For instance, the plurality of image lights B12, B13 and B14 respectively form a plurality of aerial images M32, M33 and M34 superposed onto the incident side 261, and respectively impinge in a plurality of principal incident directions D32, D33 and D34 on the incident side 261 to enter the Fresnel lens 26, and are superposed onto the incident side 211 of the light diffuser 21 through the Fresnel lens 26 and the linear concave lens 25.

In one embodiment, the plurality of principal incident directions D32, D33 and D34 are different, and are a plurality of center-light incident directions; and the incident side 261 of the Fresnel lens 26 includes a flat surface 2611. For instance, when the plurality of image lights B12, B13 and B14 include a center image light (such as the image light B13) located in the center of the plurality of image lights B12, B13 and B14, the Fresnel lens 26 refracts the plurality of image lights B12, B13 and B14 to collimate the center image light (such as the image light B13), so that the refracted center image light emerging from the emergent side 262 impinges right the incident side 251 of the linear concave lens 25 in a forward direction.

In one embodiment, the image superposing unit 30 includes an incident side 301 and an emergent side 302 opposite to the incident side 301. The incident side 301 includes an incident surface array S1, which includes a plurality of incident surfaces S12, S13 and S14. The plurality of incident surfaces S12, S13 and S14 are linearly arranged in a reference direction DR1, and respectively receive a plurality of image lights B22, B23 and B24. For instance, the reference direction DR1 is parallel to the reference direction DR3; and the plurality of image lights B22, B23 and B24 form a plurality of aerial images M42, M43 and M44 respectively on the plurality of incident surfaces S12, S13 and S14. For instance, the plurality of image lights B22, B23 and B24 are respectively derived from a plurality of viewing fields F12, F13 and F14, wherein the plurality of viewing fields F12, F13 and F14 are the same or different. The image superposing unit 30 projects or superposes the plurality of image lights B22, B23 and B24 onto the incident side 261 by converting the plurality of image lights B22, B23 and B24 respectively into the plurality of image lights B12, B13 and B14.

In one embodiment, the image superposing unit 30 includes a lens array 31, a lens array 32 and a light superposing unit 33. The lens array 31 includes the incident surface array S1 and a plurality of lenses 312, 313 and 314, wherein the plurality of lenses 312, 313 and 314 include the plurality of incident surfaces S12, S13 and S14, respectively. The plurality of image lights B22, B23 and B24 respectively impinge on the plurality of incident surfaces S12, S13 and S14 to enter the image superposing unit 30. The lens array 32 includes a plurality of lenses 322, 323 and 324, which respectively correspond to the plurality of lenses 312, 313 and 314. The light superposing unit 33 includes the emergent side 302, and emerges therefrom (or emits) the plurality of image lights B12, B13 and B14 on the emergent side 302. The plurality of image lights B22, B23 and B24 are respectively converted into the plurality of image lights B12, B13 and B14 through the lens array 31, the lens array 32 and the light superposing unit 33.

In one embodiment, the light superposing unit 33 includes a plurality of lenses 331, 332 and 333, wherein the lens 333 includes the emergent side 302. For instance, the lenses 331, 332 and 333 are a first plano-convex lens, a second plano-convex lens and a meniscus lens, respectively; and the second plano-convex lens is disposed between the first plano-convex lens and the meniscus lens. The plurality of image lights B22, B23 and B24 together pass through the lens arrays 31 and 32, and the lenses 331, 332 and 333 sequentially to respectively form the plurality of image lights B12, B13 and B14. For instance, the combination of the plurality of lenses 331, 332 and 333 is equivalent to the light superposing unit 33; and the plurality of image lights B12, B13 and B14 respectively emerge in a plurality of principal emergent directions D62, D63 and D64 from the emergent side 302. For instance, the plurality of principal emergent directions D62, D63 and D64 are a plurality of center-light emergent directions respectively, and are different. For instance, the plurality of principal incident directions D32, D33 and D34 are near to or substantially the same as the plurality of principal emergent directions D62, D63 and D64, respectively.

In one embodiment, the image superposing unit 30 receives an image light B2, splits the image light B2 into a plurality of partial lights H22, H23 and H24, and superposes the plurality of partial lights H22, H23 and H24 onto the incident side 261 to form the plurality of aerial images M32, M33 and M44 superposed on the incident side 261. For instance, the image superposing unit 30 splits the image light B2 into the plurality of partial lights H22, H23 and H24 by using the lens arrays 31 and 32, converts the plurality of partial lights H22, H23 and H24 respectively into the plurality of image lights B12, B13 and B14 by using the light superposing unit 33, thereby forming the plurality of image lights B32, B33 and B34, respectively. For instance, the image light B2 includes the plurality of image lights B22, B23 and B24, which respectively enter the plurality of incident surfaces S12, S13 and S14 to respectively form the plurality of partial lights H22, H23 and H24.

In one embodiment, the pre-imaging unit 40 emerges therefrom (or emits) the image light B2 including the plurality of image lights B22, B23 and B24 onto the image superposing unit 30, and includes an image-signal processing unit 41 and a projection module 50 coupled to the image-signal processing unit 41. For instance, the pre-imaging unit 40 is coupled to the image superposing unit 30 through the image light B2, and forms the plurality of viewing fields F12, F13 and F14, wherein the plurality of image lights B22, B23 and B24 are respectively derived from the plurality of viewing fields F12, F13 and F14.

In one embodiment, the image-signal processing unit 41 includes an imaging area 42, which has a plurality of sub-areas 422, 423 and 424, wherein the plurality of sub-areas 422, 423 and 424 are linearly arranged in a reference direction DR4 opposite to the reference direction DR1. The image-signal processing unit 41 causes the imaging area 42 to form a picture P1 including a plurality of images M52, M53 and M54, wherein the plurality of images M52, M53 and M54 are sub-pictures of the picture P1. For instance, the image-signal processing unit 41 causes the plurality of sub-areas 422, 423 and 424 to respectively form the plurality of images M52, M53 and M54, which respectively correspond to the plurality of image lights B12, B13 and B14. By respectively displaying the plurality of images M52, M53 and M54, the image-signal processing unit 41 forms the plurality of viewing fields F12, F13 and F14 respectively on the plurality of sub-areas 422, 423 and 424, and emerges therefrom (or emits) a plurality of image lights B42, B43 and B44 respectively from the plurality of sub-areas 422, 423 and 424, wherein the plurality of image lights B42, B43 and B44 correspond to the plurality of image lights B12, B13 and B14, respectively. For instance, the image-signal processing unit 41 includes a liquid crystal panel, and projects the picture P1 onto the incident side 301 of the image superposing unit 30 to form the image light B2.

In one embodiment, the pre-imaging unit 40 projects the picture P1 onto the incident surface array S1 of the image superposing unit 30 to form the plurality of aerial images M42, M43 and M44 respectively on the plurality of incident surfaces S12, S13 and S14 in order that the lens arrays 31 and 32 split the picture P1. In one embodiment, the linear concave lens 25 causes an incident image light deviated from the optical axis direction EA1D to increasingly deviate from the optical axis direction EA1D. Furthermore, the light diffusion angle A1 of the light diffuser 21 causes the light diffuser 21 to have a property of a viewing-angle limitation; and the light diffuser 21 gives according to the light diffusion angle A1 a limitation that an observer under a specific sight line can only watch an image corresponding to a specific image, wherein the specific image is one selected from the plurality of images M52, M53 and M54. The image displaying device 12 can simultaneously split the picture P1 into a plurality of sub-pictures in order that different persons respectively watch different sub-pictures on the same light diffuser 21.

In one embodiment, the projection module 50 projects the plurality of images M52, M53 and M54 onto the image superposing unit 30 to form the plurality of image lights B22, B23 and B24 respectively, and includes an aperture stop 51, a projecting unit 52 and a projecting unit 53. For instance, the projecting unit 52 is coupled to the projecting unit 53 through the aperture stop 51. The aperture stop 51 has an aperture position 51P and an aperture area 51A at the aperture position 51P. The projecting unit 52 is disposed between the image-signal processing unit 41 and the aperture position 51P. The projecting unit 53 is disposed between the aperture position 51P and the image superposing unit 30. The plurality of image lights B42, B43 and B44 are respectively converted into the plurality of image lights B22, B23 and B24 through the projecting unit 52, the aperture area 51A and the projecting unit 53.

In one embodiment, the projection module 50 is omitted; and the image-signal processing unit 41 emerges therefrom (or emits) the image light B2, forms the plurality of viewing fields F12, F13 and F14 respectively on the plurality of sub-areas 422, 423 and 424, and emerges therefrom (or emits) the plurality of image lights B22, B23 and B24 respectively from the plurality of sub-areas 422, 423 and 424.

Figure 4:
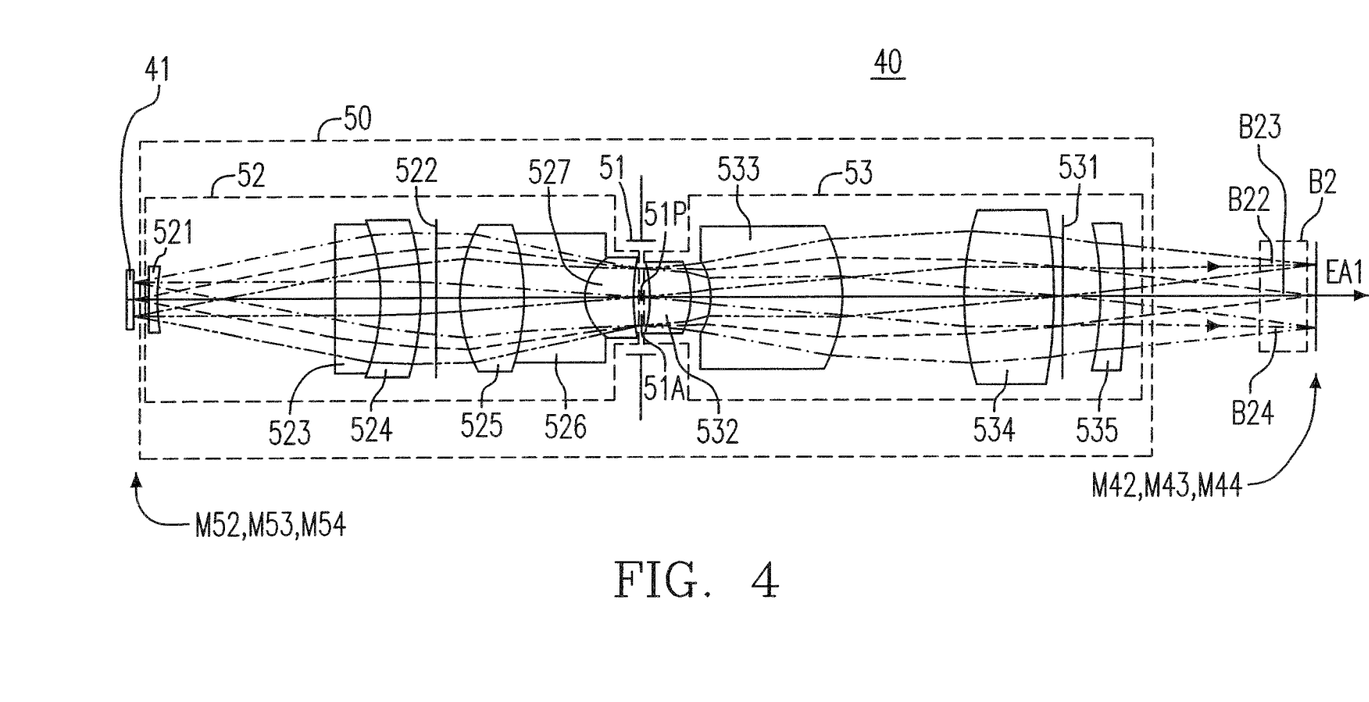
FIG. 4 is a schematic diagram showing a pre-imaging unit in FIG. 3.

Please refer to FIG. 4, which is a schematic diagram showing a pre-imaging unit 40 in FIG. 3. As shown in FIG. 4, the pre-imaging unit 40 includes the image-signal processing unit 41 and the projection module 50. The projection module 50 includes the aperture stop 51, the projecting unit 52 and the projecting unit 53. The aperture stop 51 has an aperture position 51P and an aperture area 51A at the aperture position 51P. The projecting unit 52 includes an object lens 521, a light modulator 522 and a plurality of lenses 523, 524, 525, 526 and 527, wherein the structures and the configurations of the object lens 521, the light modulator 522 and the plurality of lenses 523, 524, 525, 526 and 527 are shown in FIG. 4. For instance, the object lens 521 is a panel object lens.

The projecting unit 53 includes a light modulator 531 and a plurality of lenses 532, 533, 534 and 535, wherein the structures and the configurations of the light modulator 531 and the plurality of lenses 532, 533, 534 and 535 are shown in FIG. 4. The image-signal processing unit 41 forms the plurality of images M52, M53 and M54 respectively corresponding to the plurality of image lights B12, B13 and B14; and the projection module 50 projects the plurality of images M52, M53 and M54 respectively onto the plurality of incident surfaces S12, S13 and S14, respectively corresponding to the plurality of images M52, M53 and M54, to form the plurality of images M42, M43 and M44, respectively corresponding to the plurality of images M52, M53 and M54.

Figure 5:
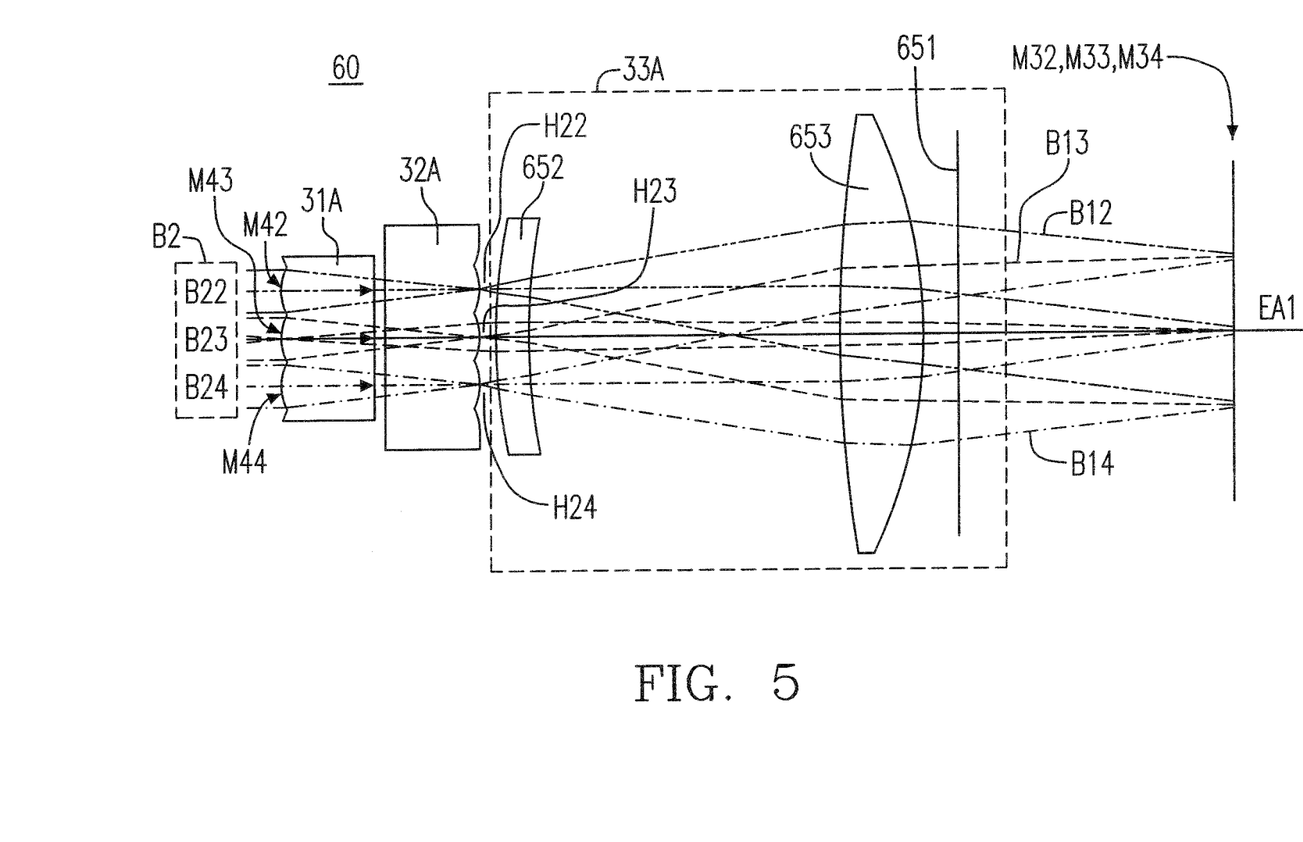
FIG. 5 is a schematic diagram showing an image superposing unit according to some embodiments of the present disclosure.

Please refer to FIG. 5, which is a schematic diagram showing an image superposing unit 60 according to some embodiments of the present disclosure. The image superposing unit 60 is an implementation structure of the image superposing unit 30, and includes a lens array 31A, a lens array 32A and a light superposing unit 33A. Each of the lens arrays 31A and 32A is a plano-convex lens array, and the lens arrays 31B and 32B include a third convex side and a fourth convex side, respectively; the third convex side faces an image source of the plurality of image lights B22, B23 and B24, and the reverse side of the fourth convex side faces the image source. The light superposing unit 33A includes a light modulator 651 and two lenses 652 and 653. For instance, the lenses 652 and 653 are a meniscus lens and a biconvex lens, respectively.

Figure 6:
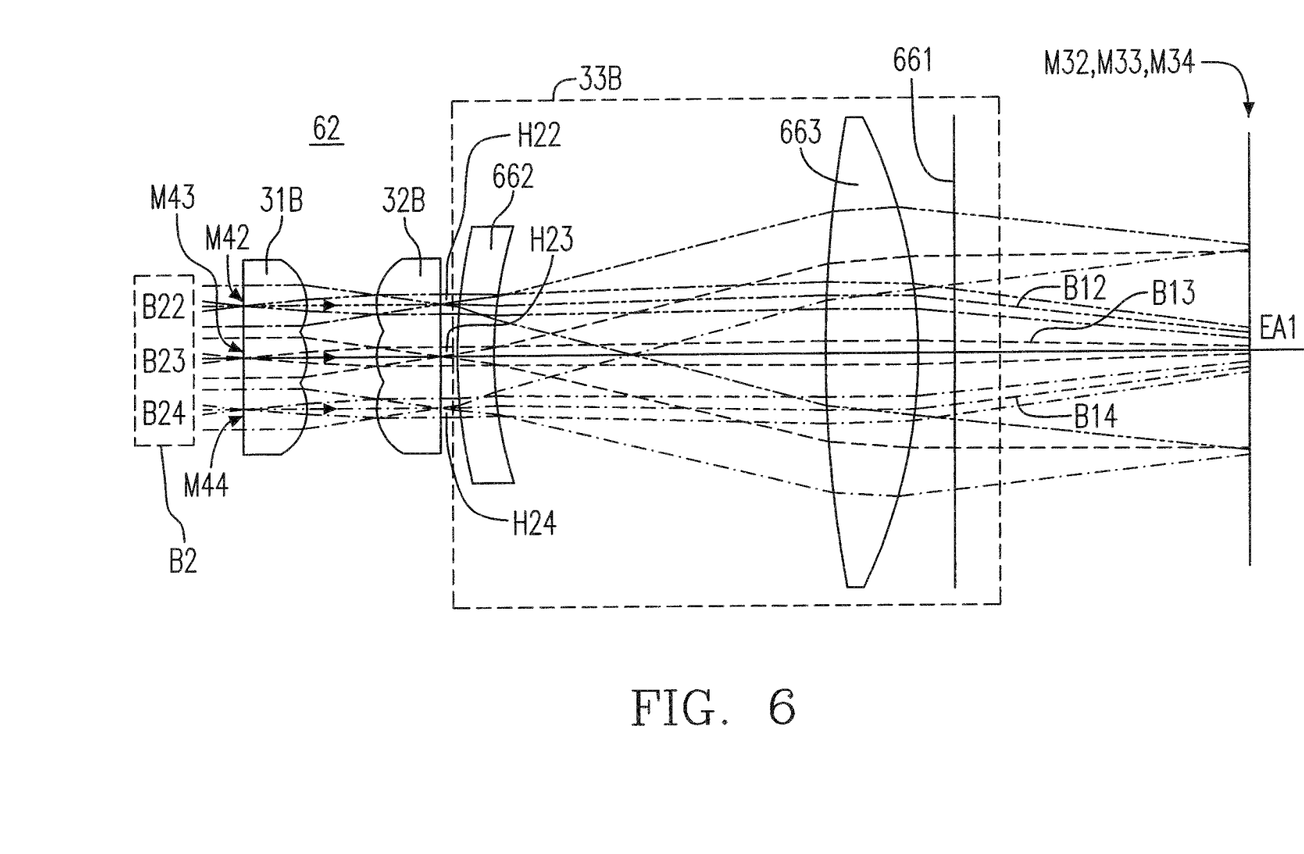
FIG. 6 is a schematic diagram showing an image superposing unit according to some embodiments of the present disclosure.

Please refer to FIG. 6, which is a schematic diagram showing an image superposing unit 62 according to some embodiments of the present disclosure. The image superposing unit 62 is an implementation structure of the image superposing unit 30, and includes a lens array 31B, a lens array 32B and a light superposing unit 33B. Each of the lens arrays 31B and 32B is a plano-convex lens array, and the lens arrays 31B and 32B include a fifth convex side and a sixth convex side, respectively; the reverse side of the fifth convex side faces an image source of the plurality of image lights B22, B23 and B24, and the sixth convex side faces the image source. The light superposing unit 33B includes a light modulator 661 and two lenses 662 and 663. For instance, the lenses 662 and 663 are a meniscus lens and a biconvex lens, respectively.

Figure 7:
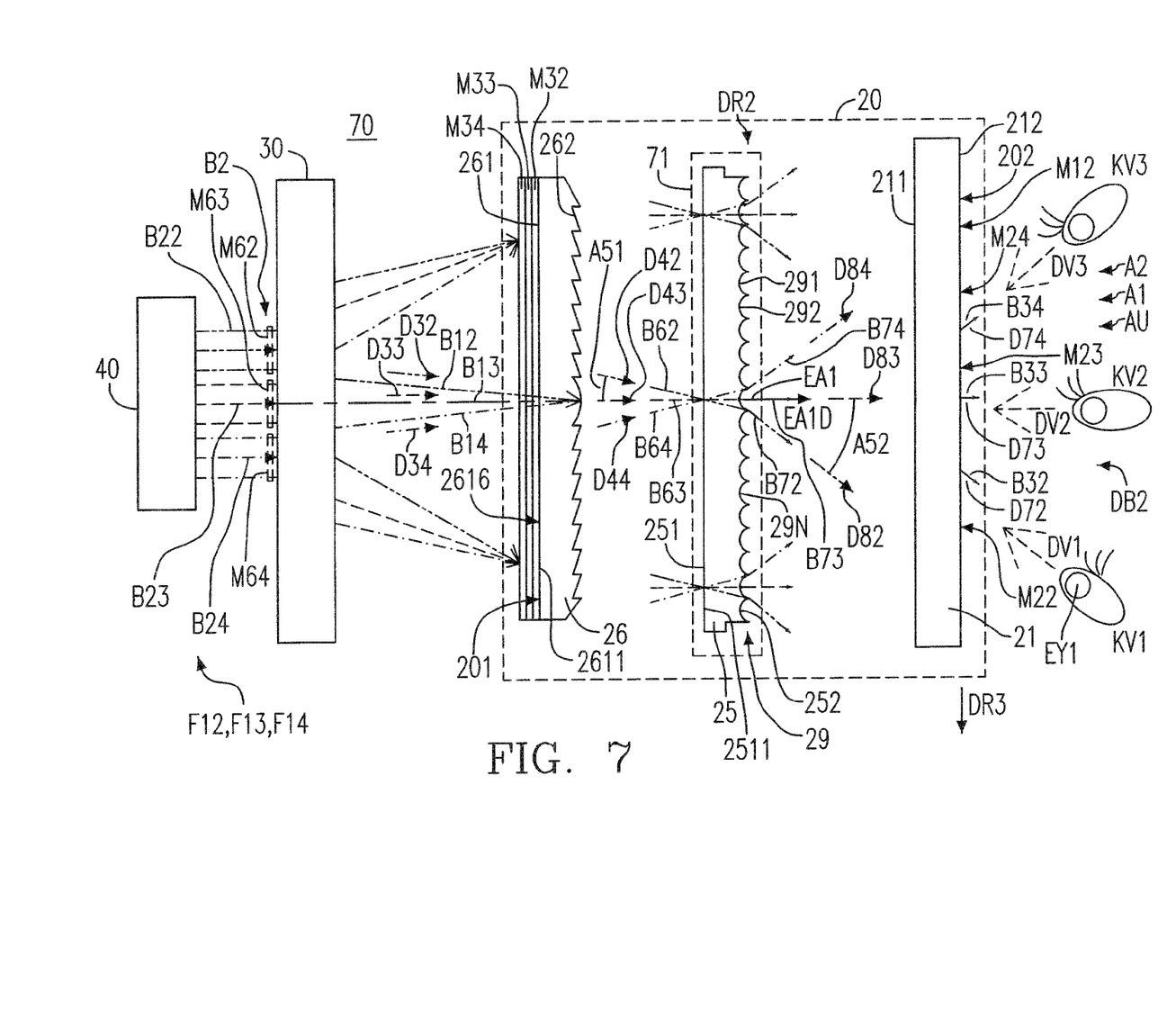
FIG. 7 is a schematic diagram showing an image displaying device according to some embodiments of the present disclosure.

Please refer to FIG. 7, which is a schematic diagram showing an image displaying device 70 according to some embodiments of the present disclosure. The image displaying device 70 includes an optical axis EA1 and a lens device 71, wherein the optical axis EA1 has an optical axis direction EA1D. The lens device 71 includes an incident side 251 and an emergent side 252. The incident side 251 receives an image light B62 incident in a principal incident direction D42. The emergent side 252 emerges therefrom (or emits) an image light B72 associated with the image light B62 in a principal emergent direction D82 to form an image M12, such that when the principal incident direction D42 deviates from the optical axis direction EA1D, the principal emergent direction D82 further deviates from the optical axis direction EA1D.

In one embodiment, the optical axis EA1 is a system optical axis, and the optical axis direction EA1D is a system optical axis direction. The principal incident direction D42 is a center-light incident direction, and the principal emergent direction D82 is a center-light emergent direction. The principal incident direction D42 and the optical axis direction EA1D have an angle A51 therebetween; and the principal emergent direction D82 and the optical axis direction EA1D have an angle A52 therebetween. When the angle A51 is greater than zero, the angle A52 is greater than the angle A51.

In one embodiment, the lens device 71 further includes a linear concave lens 25, which includes the incident side 251 and the emergent side 252 opposite to the incident side 251. The incident side 251 further receives at least an image light B63 (such as the image light B63 and an image light B64), wherein the image light B62 and the at least an image light B63 (such as the image lights B63 and B64) constitute a plurality of image lights B62, B63 and B64. The plurality of image lights B62, B63 and B64 are respectively derived from a plurality of viewing fields F12, F13 and F14, wherein the plurality of viewing fields F12, F13 and F14 are the same or different. The incident side 251 includes a flat surface 2511. The emergent side 252 includes a concave cylindrical lens array 29.

In one embodiment, the plurality of image lights B62, B63 and B64 respectively impinge in a plurality of principal incident directions D42, D43 and D44 on the incident side 251 to enter the lens device 71. The lens device 71 emerges therefrom (or emits) a plurality of image lights B72, B73 and B74, respectively corresponding to the plurality of image lights B62, B63 and B64, in response to the plurality of image lights B62, B63 and B64, wherein the plurality of image lights B72, B73 and B74 respectively emerge in a plurality of principal emergent directions D82, D83 and D84 from the emergent side 252.

In one embodiment, the image displaying device 70 further includes a Fresnel lens 26 and a light diffuser 21, wherein the lens device 71 is disposed between the Fresnel lens 26 and the light diffuser 21. The Fresnel lens 26 includes an incident side 261 and an emergent side 262 opposite to the incident side 261, wherein the emergent side 262 is coupled to the incident side 251 of the lens device 71. The incident side 261 receives a plurality of image lights B12, B13 and B14 respectively corresponding to the plurality of image lights B62, B63 and B64; the plurality of image lights B12, B13 and B14 respectively impinge in a plurality of principal incident directions D32, D33 and D34 on the incident side 261; and the emergent side 262 emerges therefrom (or emits) the plurality of image lights B62, B63 and B64.

In one embodiment, the light diffuser 21 is only observed in an observation direction DV1 (such as observed only by the observer KV1), and includes a light diffusion angle A1, an incident side 211 and an emergent side 212 opposite to the incident side 211, wherein the incident side 211 is coupled to the emergent side 252 of the lens device 71, and the emergent side 212 emerges therefrom (or emits) a plurality of image lights B32, B33 and B34 respectively corresponding to the plurality of image lights B62, B63 and B64. The plurality of image lights B12, B13 and B14 respectively form a plurality of aerial images M32, M33 and M34 superposed on the incident side 261. The plurality of image lights B32, B33 and B34 respectively emerge in a plurality of principal emergent directions D72, D73 and D74 from the emergent side 212. The image M12 presents in a second principal emergent direction DB2 being one of the plurality of principal emergent directions D72, D73 and D74. When the observation direction DV1 is opposite to the principal emergent direction DB2, the emergent side 212 only displays the image M12. For instance, the image M12 is one selected from the plurality of images M22, M23 and M24.

In one embodiment, the image displaying device 70 includes the display module 20, an image superposing unit 30 coupled to the display module 20, and a pre-imaging unit 40 coupled to the image superposing unit 30. The display module 20 includes the Fresnel lens 26, the lens device 71 and the light diffuser 21. The pre-imaging unit 40 forms a plurality of images M62, M63 and M64. The image superposing unit 30 is coupled to the Fresnel lens 26, projects the plurality of images M62, M63 and M64 onto the incident side 261 of the Fresnel lens 26, and superposes a plurality of images M32, M33 and M34, respectively corresponding to the plurality of images M62, M63 and M64, on the incident side 261. In one embodiment, the incident side 261 of the Fresnel lens 26 includes a specific area 2616 located on the incident side 261. For instance, the specific area 2616 is located on the flat surface 2611 of the Fresnel lens 26. The image superposing unit 30 superposes the plurality of images M62, M63 and M64 onto the same specific area 2616. For instance, the display module 20 serves as a rear projection screen; and the plurality of images M62, M63 and M64 are a plurality of aerial images M42, M43 and M44 respectively.

In one embodiment in reference to FIG. 2, FIG. 3 and FIG. 7, an image displaying method includes the following steps: a plurality of image lights B12, B13 and B14 is provided; the plurality of image lights B12, B13 and B14 are superposed; and an image M12 is displayed from only one of the plurality of superposed image lights B62, B63 and B64. In one embodiment, the plurality of image lights B12, B13 and B14 are superposed onto a same specific area 2616 to respectively form the plurality of superposed image lights B62, B63 and B64; and the plurality of superposed image lights B62, B63 and B64 have a plurality of predetermined principal transmission directions (such as the plurality of principal incident directions D42, D43 and D44), respectively. In one embodiment, the image displaying method further includes the following steps: the plurality of superposed image lights B62, B63 and B64 are diverged to form a plurality of diverged image lights B72, B73 and B74, wherein the plurality of superposed image lights B62, B63 and B64 are diverged to diverge the plurality of predetermined principal transmission directions (such as the plurality of principal incident directions D42, D43 and D44); a light diffuser 21 is provided; and the plurality of diverged image lights B72, B73 and B74 is caused to pass the light diffuser 21 to display the first image M12 only in an observation direction (such as the observation direction DV1). For instance, the light diffuser 21 is caused to be only observed in the observation direction (such as the observation direction DV1).

In one embodiment, the image displaying method further includes the following steps. The plurality of image lights B12, B13 and B14 are respectively derived from a plurality of viewing fields F12, F13 and F14, wherein the plurality of viewing fields F12, F13 and F14 are the same or different. The light diffuser 21 is caused to emerge therefrom (or emit) a plurality of image lights B32, B33 and B34 respectively corresponding to the plurality of image lights B12, B13 and B14 in response to the plurality of diverged image lights B72, B73 and B74, wherein the plurality of image lights B32, B33 and B34 respectively emerge in a plurality of principal emergent directions D72, D73 and D74 from the light diffuser 21.

In one embodiment, the image M12 presents in a principal emergent direction DB2 (such as the principal emergent direction D72) being one of the plurality of principal emergent directions D72, D73 and D74. The plurality of principal transmission directions (such as the plurality of principal incident directions D42, D43 and D44) are a plurality of different radial directions. The light diffuser 21 has a light diffusion angle A1. Any two of the plurality of principal emergent direction D72, D73 and D74 have an angle AU (such as the angle AU1) therebetween, wherein the angle AU (such as the angle AU1) is greater than a specific angle A2 associated with the light diffusion angle A1. When the observation direction (such as the observation direction DV1) is opposite to the principal emergent direction DB2 (such as the principal emergent direction D72), the image M12 is only displayed on the light diffuser 21.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An image display device, comprising:
   a pre-imaging unit forming a plurality of different fields by displaying a plurality of different first images respectively corresponding to the plurality of different fields;
   a diffuser comprising a first incident side and a first outgoing side; and
   an image overlapping unit emitting therefrom a plurality of first image lights, and the plurality of first image lights being overlapping onto the first incident side, wherein:
   the plurality of first image lights are respectively derived from the plurality of different fields;
   the plurality of first image lights are overlapped onto the first incident side to cause a plurality of second image lights respectively corresponding to the plurality of first image lights to be emitted from the first outgoing side;
   the plurality of second image lights are respectively emitted in a plurality of different main transmission directions from the first outgoing side to cause a diffuser to display a plurality of different second images on the first outgoing side, wherein the plurality of different second images respectively correspond to the plurality of first image lights, and are only respectively derived from the plurality of different first images; and
   when a plurality of observers only simultaneously respectively observe the first outgoing side in a plurality of viewing directions respectively opposite to the plurality of different main transmission directions, the plurality of observers only respectively observe the plurality of different second images.

2. An image display device according to claim 1, wherein the diffuser has a light diffusion angle, and the first outgoing side is opposite to the first incident side.

3. An image display device according to claim 2, wherein any two of the plurality of main transmission directions have a first angle therebetween, and the first angle is greater than a specific angle associated with the light diffusion angle.

4. An image display device according to claim 1, wherein the image overlapping unit includes a plurality of incident surfaces to receive a plurality of third image lights respectively, and the plurality of incident surfaces are linearly arranged in a first reference direction, and receive the plurality of third image lights respectively.

5. An image device according to claim 4, wherein the image overlapping unit converts the plurality of third image lights into the plurality of first image lights respectively, and the plurality of third image lights are respectively derived from the plurality of different fields.

6. An image display device according to claim 4, further comprising:
   a linear concave lens including a second incident side and a second outgoing side opposite to the second incident side, wherein the second incident side includes a flat surface, and the second outgoing side is coupled to the first incident side and includes a plurality of concave cylindrical lenses linearly arranged in a second reference direction parallel to the first reference direction; and
   a Fresnel lens including a third incident side and a third outgoing side opposite to the third incident side and coupled to the second incident side.

7. An image displaying display device according to claim 6, wherein the plurality of first image lights form a plurality of aerial images overlapped on the third incident side respectively, and are overlapped onto the first incident side through the Fresnel lens and the linear concave lens.

8. An image display device according to claim 4, wherein the image overlapping unit further comprises:
   a first lens array comprising the plurality of incident surfaces, wherein the plurality of third image lights respectively pass through the plurality of incident surfaces to enter the image overlapping unit; and
   a second lens array comprising a plurality of outgoing surfaces, wherein the plurality of first image lights pass through the plurality of outgoing surfaces.

9. An image display device according to claim 8, wherein the second lens array is disposed between the first lens array and the diffuser, and the plurality of third image lights are respectively converted into the plurality of first image lights through the first lens array and the second lens array.

10. An image display device according to claim 4, wherein the pre-imaging unit comprises:
    a signal processing unit comprising an imaging area having a plurality of sub-areas;
    an aperture stop having an aperture position and an aperture area at the aperture position;
    a first projection unit disposed between the signal processing unit and the aperture position; and
    a second projection unit disposed between the aperture position and the image overlapping unit.

11. An image display device according to claim 10, wherein the plurality of sub-areas are linearly arranged in a third reference direction opposite to the first reference direction, the signal processing unit causes the plurality of sub-areas to respectively display the plurality of different first images respectively corresponding to the plurality of first image lights, the plurality of sub-areas respectively form the plurality of different fields, and respectively emit therefrom a plurality of fourth image lights, by respectively displaying the plurality of different first images, and the plurality of fourth image lights are respectively converted into the plurality of third image lights through the first projection unit, the aperture area and the second projection unit.

12. An image display device, comprising:
    a diffuser including a first incident side and a first outgoing side;
    an image overlapping unit emitting therefrom a plurality of first image lights overlapping onto the first incident side;
    a linear concave lens including a second incident side and a second outgoing side opposite to the second incident side, wherein the second incident side includes a flat surface, and the second outgoing side is coupled to the first incident side and includes a plurality of concave cylindrical lenses linearly arranged in a first reference direction; and
    a Fresnel lens including a third incident side and a third outgoing side opposite to the third incident side and coupled to the second incident side, wherein:
    the plurality of overlapping first image lights pass through the diffuser;
    the diffuser displays a first image corresponding to one of the plurality of first image lights in a first viewing direction on the first outgoing side, and displays a second image corresponding to another of the plurality of first image lights in a second viewing direction on the first outgoing side;

the image overlapping unit includes a plurality of incident surfaces respectively receiving a plurality of second image lights, and converts the plurality of second image lights into the plurality of first image lights respectively; and the plurality of incident surfaces are linearly arranged in a second reference direction parallel to the first reference direction.

13. An image display device according to claim 12, wherein the plurality of first image lights form a plurality of aerial images overlapped on the third incident side respectively, and are overlapped onto the first incident side through the Fresnel lens and the linear concave lens.

14. An image display device, comprising:
a diffuser including a first incident side and a first outgoing side;
an image overlapping unit emitting therefrom a plurality of first image lights overlapping onto the first incident side;
a pre-imaging unit including:
a signal processing unit including an imaging area having a plurality of sub-areas;
an aperture stop having an aperture position and an aperture area at the aperture position;
a first projection unit disposed between the signal processing unit and the aperture position; and
a second projection unit disposed between the aperture position and the image overlapping unit, wherein:

the plurality of overlapping first image lights pass through the diffuser;

the diffuser displays a first image corresponding to one of the plurality of first image lights in a first viewing direction on the first outgoing side, and displays a second image corresponding to another of the plurality of first image lights in a second viewing direction on the first outgoing side;

the image overlapping unit includes a plurality of incident surfaces respectively receiving a plurality of second image lights, and converts the plurality of second image lights into the plurality of first image lights respectively;

the plurality of incident surfaces are linearly arranged in a first reference direction;

the plurality of sub-areas are linearly arranged in a second reference direction opposite to the first reference direction;

the signal processing unit causes the plurality of sub-areas to respectively display a plurality of different images respectively corresponding to the plurality of first image lights;

the plurality of sub-areas respectively form the plurality of different fields, and respectively emit therefrom a plurality of third image lights, by respectively displaying the plurality of different images; and the plurality of third image lights are respectively converted into the plurality of second image lights through the first projection unit, the aperture area and the second projection unit.

\* \* \* \* \*